United States Patent
Lackey et al.

(10) Patent No.: US 7,406,408 B1
(45) Date of Patent: Jul. 29, 2008

(54) METHOD OF RECOGNIZING PHONES IN SPEECH OF ANY LANGUAGE

(75) Inventors: Bradley C. Lackey, Odenton, MD (US); Patrick J. Schone, Columbia, MD (US); Brenton D. Walker, College Park, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 834 days.

(21) Appl. No.: 10/928,878

(22) Filed: Aug. 24, 2004

(51) Int. Cl.
*G10L 15/06* (2006.01)
*G10L 15/08* (2006.01)

(52) U.S. Cl. .............................. 704/8; 704/10; 704/240; 704/277

(58) Field of Classification Search ..................... 704/8, 704/10, 231, 240, 251, 257, 277
See application file for complete search history.

(56) References Cited

U.S. PATENT DOCUMENTS

| | | | |
|---|---|---|---|
| 5,758,023 A | | 5/1998 | Bordeaux |
| 5,815,639 A | * | 9/1998 | Bennett et al. ............... 704/235 |
| 5,926,787 A | * | 7/1999 | Bennett et al. ............... 704/235 |
| 5,950,159 A | | 9/1999 | Knill |
| 6,002,998 A | * | 12/1999 | Martino et al. .................. 704/9 |
| 6,023,670 A | * | 2/2000 | Martino et al. .................. 704/8 |
| 6,073,095 A | | 6/2000 | Dharanipragada et al. |
| 6,085,160 A | * | 7/2000 | D'hoore et al. ........... 704/256.2 |
| 6,385,579 B1 | | 5/2002 | Padmanabhan et al. |
| 6,549,883 B2 | * | 4/2003 | Fabiani et al. .................. 704/10 |
| 6,832,191 B1 | * | 12/2004 | Frasca et al. ................. 704/257 |
| 6,912,499 B1 | * | 6/2005 | Sabourin et al. ............. 704/243 |
| 7,043,431 B2 | * | 5/2006 | Riis et al. ..................... 704/259 |
| 7,149,688 B2 | * | 12/2006 | Schalkwyk ................. 704/255 |
| 7,191,116 B2 | * | 3/2007 | Alpha ............................ 704/8 |
| 2002/0184003 A1 | * | 12/2002 | Hakkinen et al. .............. 704/8 |
| 2003/0065503 A1 | * | 4/2003 | Agnihotri et al. .............. 704/7 |
| 2003/0135356 A1 | | 7/2003 | Ying et al. |
| 2004/0204942 A1 | * | 10/2004 | Lee ............................. 704/254 |
| 2005/0033575 A1 | * | 2/2005 | Schneider ................... 704/254 |
| 2005/0197837 A1 | * | 9/2005 | Suontausta et al. .......... 704/260 |

OTHER PUBLICATIONS

Francoise Beaufays et al., "Learning Name Pronunciations in Automatic Speech Recognition Systems," undated.

\* cited by examiner

*Primary Examiner*—Martin Lerner
(74) *Attorney, Agent, or Firm*—Robert D. Morelli

(57) ABSTRACT

Method of recognizing phones in speech of any language. Acquire phones for all languages and a set of languages. Acquire a pronunciation dictionary, a transcript of speech for the set of languages, and speech for the transcript. Receive speech containing unknown phones. If the speech's language is unknown, compare it to the phones for all languages to determine the phones. If the language is known but no phones were acquired in that language, compare the speech to the phones for all languages to determine the phones. If phones were acquired in the speech's language but no corresponding pronunciation dictionary was acquired, compare the speech to the phones for all languages to determine the phones. If a pronunciation dictionary was acquired for the phones in the speech's language but no transcript was acquired then compare the speech to the phones for all languages to determine the phones.

23 Claims, 2 Drawing Sheets

METHOD OF RECOGNIZING PHONES IN SPEECH OF ANY LANGUAGE

FIELD OF THE INVENTION

The present invention relates, in general, to data processing and, in particular, to speech signal processing.

BACKGROUND OF THE INVENTION

A phone is the minimum unit of sound articulated during speech. A phoneme is the minimum unit of speech that distinguishes one word from another. A phoneme may consist of one or more phones, and variations of phones (i.e., allophones) may be used without changing the meaning of the corresponding word. The exact number of phonemes in English depends on the speaker, but it is accepted that English contains between 40 and 45 phonemes, which is about average. At the extremes, one language contains only 10 while another contains 141.

Phonetic writing, or transcription, is the representation of the sounds of speech with a set of distinct symbols. For example, the letters used to spell the word "call" are intended to represent the meaning of the word, whereas the phonetic representation of the word (i.e., "kO1") is meant to represent how the word should be pronounced. The primary script used for phonetic writing is the International Phonetic Alphabet.

Speech processing applications often require a database of writings (corpus) or a number of such databases (corpora). Corpora have been generated with and without phonetic information. Phonetic information is required for any speech processing application that performs an interpretation of, or conversion to, a spoken sound.

Speech data is phonetically labeled either manually or by an automatic method commonly referred to as brute-force alignment or force alignment for short. In force alignment, each phone in question is associated with the closest phonetic sound available. For example, if a book written in English were force aligned using two different databases of phones where each database had a wide enough selection of phones to cover all of the words used in the book (e.g., English and Italian), the results would be understandable to an English speaking person, but the result that used the Italian phone database would have a distinctive Italian sound to it because the closest sounding Italian phone would not exactly match the sound of the corresponding English phone.

With the every increasing globalization of activities, it is becoming more important for speech processing application to process more than one language and, therefore, recognize the phones of more than one language.

One approach to adding multi-lingual capability to speech processing applications is to combine corpora which have been tailored to a specific language. However, blindly combining corpora which have been phonetically transcribed by different methods or people often produce worse results than just using one corpus. The reason for this is that inaccuracies may be introduced by a method or person having its own threshold for determining when a textual unit matches a phone and vice versa. Since the difference in sound between one word and a word of another meaning can be very slight, any inaccuracy in the interpretation or conversion of a sound could result in something that is totally unintelligible. For example, in has been reported that voice recognition systems trained on corpora of American English speakers do a poor job of interpreting the words of British English speakers.

In an article entitled "Learning Name Pronunciations in Automatic Speech Recognition Systems, Francoise Beaufays et al. disclose a method of learning proper name pronunciation by finding the phone sequence that best matches a sample speech waveform. The method employs linguistic knowledge to determine if the resulting pronunciation is linguistically reasonable.

U.S. Pat. No. 5,758,023, entitled "MULTI-LANGUAGE SPEECH RECOGNITION SYSTEM," discloses a device for and method of transcribing speech into one of many predetermined spoken languages by identifying phones, combining the phones into phonemes, and translating the phonemes into the desired foreign language. U.S. Pat. No. 5,758,023 is hereby incorporated by reference into the specification of the present invention.

U.S. Pat. No. 5,950,159, entitled "WORD SPOTTING USING BOTH FILLER AND PHONE RECOGNITION," discloses a device for and method of word spotting by processing acoustic data to identify phones, generate temporal delimiters, generate likelihood scores, identifying sequences of phones, and using the temporal delimiters and likelihood scores to recognize keywords. U.S. Pat. No. 5,950,159 is hereby incorporated by reference into the specification of the present invention.

U.S. Pat. No. 6,073,095, entitled "FAST VOCABULARY INDEPENDENT METHOD AND APPARATUS FOR SPOTTING WORDS IN SPEECH," discloses a device for and method of spotting words by using Viterbi-beam phone level decoding with a tree-based phone language model. U.S. Pat. No. 6,073,095 is hereby incorporated by reference into the specification of the present invention.

U.S. Pat. No. 6,385,579 B1, entitled "METHODS AND APPARATUS FOR FORMING COMPOUND WORDS FOR USE IN A CONTINUOUS SPEECH RECOGNITION SYSTEM," discloses a device for and method of identifying consecutive word pairs and replacing the same with a corresponding compound word. U.S. Pat. No. 6,385,579 B1 is hereby incorporated by reference into the specification of the present invention.

U.S. Pat. Appl. No. 2003/0135356 A1, entitled "METHOD AND APPARATUS FOR DETECTING PROSODIC PHRASE BREAK IN A TEXT TO SPEECH (TTS) SYSTEM," discloses a device for and method of processing speech by receiving text, identifying parts of speech, generating a part of speech sequence, detecting prosodic phrase break using a neural network, and generating a prosodic phrase boundary based on the prosodic breaks. U.S. Pat. Appl. No. 2003/0135356 A1 is hereby incorporated by reference into the specification of the present invention.

There is a need to add multi-lingual capability to speech processing application. To do this, one needs to be able to recognize phones from multiple languages.

SUMMARY OF THE INVENTION

It is an object of the present invention to recognize phones in any language.

It is another object of the present invention to recognize phones in any language using linguistic data that includes a database of phones that includes phones from all languages, a database of phones for a particular language, a pronunciation dictionary for a specific language, transcripts of speech in a specific language, and speech in a specific language.

The present invention is a method of recognizing phones in speech of any language.

The first step of the method is acquiring phones for all languages, including information on the phones that indicate in which languages the phones are valid.

The second step of the method is acquiring phones for each of a user-definable number of specific languages.

The third step of the method is acquiring a pronunciation dictionary for each specific language for which phones where acquired and the frequency of occurrence of the phones in each pronunciation dictionary.

The fourth step of the method is acquiring transcripts of speech for languages and the frequency of occurrence of the phones contained therein.

The fifth step of the method is acquiring speech for a user-definable number of the transcripts and the frequency of occurrence of the phones in each acquired speech sample.

The sixth step of the method is receiving speech for which phones contained therein are not identified.

If the language of the received speech is not known then the seventh step of the method is comparing the received speech to the phones acquired in the first step and identifying the phones in the speech as those acquired in the first step to which they most closely match and stopping. Otherwise, proceeding to the next step.

If the language of the received speech is known but no phones were acquired in the second step in the language then the eighth step of the method is comparing the received speech to the phones acquired in the first step and identifying the phones in the speech as those acquired in the first step to which they most closely match and stopping. Otherwise, proceeding to the next step.

If phones were acquired in the second step in the language of the received speech but no pronunciation dictionary was acquired in the third step for the phones acquired in the second step then the ninth step of the method is comparing the received speech to the phones acquired in the first step that are valid in the language of the received speech and identifying the phones in the speech as those acquired in the first step which are valid, to which they most closely match, and stopping. Otherwise, proceeding to the next step.

If a pronunciation dictionary was acquired in the third step for the phones acquired in the second step in the language of the received speech but no transcript was acquired in the fourth step in the language of the received speech then the tenth, and last, step of the method is comparing the received speech to the phones acquired in the first step that are valid in the language of the received speech and identifying the phones in the speech as those acquired in the first step which are valid, to which they most likely match considering the probability of occurrence of each phone in the pronunciation dictionary, and stopping.

DETAILED DESCRIPTION

The present invention is a method of recognizing phones in speech of any language.

Figure 1:
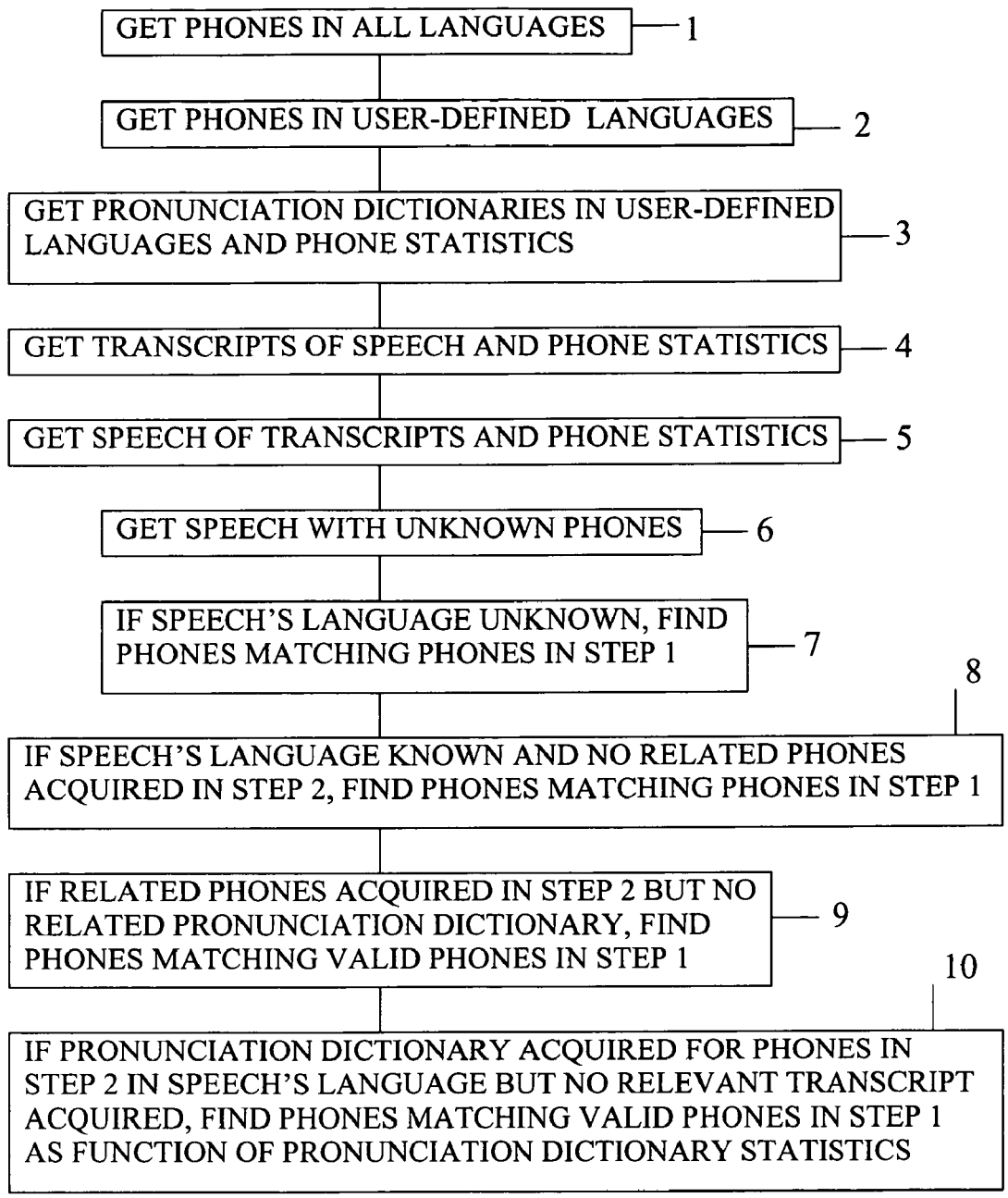
FIG. 1 is a list of the steps of the present invention.

FIG. 1 is a list of steps of the present method.

The first step 1 of the method is acquiring phones for all languages and information on the phones that indicate in which languages the phones are valid. 4. Phones for all languages are acquired from an existing database of phones for all languages or by creating them.

The second step 2 of the method is acquiring phones for each of a user-definable number of languages. Phones for each of a user-definable number of languages are acquired from an existing database of phones for each of a user-definable number of languages or by creating them.

The third step 3 of the method is acquiring a pronunciation dictionary for a user-definable number of languages for which phones where acquired in the second step 2 and performing a statistical analysis of each pronunciation dictionary acquired to determine the probability of occurrence of each phone in the pronunciation dictionary. Pronunciation dictionaries are acquired from an existing database of pronunciation dictionaries or by creating them. A statistical analysis of each pronunciation dictionary comprises performing an n-gram analysis of each pronunciation dictionary.

The fourth step 4 of the method is acquiring at least one transcript of speech for each of a user-definable number of languages, where each of the transcripts identifies the phones included therein, and performing a statistical analysis of each transcript acquired to determine the probability of occurrence of each phone in the transcript. Transcripts are acquired from an existing database of transcripts or by creating them. A statistical analysis of each transcript comprises performing an n-gram analysis of each transcript.

The fifth step 5 of the method is acquiring speech for a user-definable number of the at least one transcript acquired in the fourth step 4 and performing a statistical analysis of each speech acquired to determine the probability of occurrence of each phone in the speech. Speech is acquired from an existing database of speech or by creating it. A statistical analysis of speech comprises performing an n-gram analysis of the speech.

The sixth step 6 of the method is receiving speech for which phones contained therein are not identified.

If the language of the received speech is not known then the seventh step 7 of the method is comparing the received speech to the phones acquired in the first step 1 and declaring the received speech to include the phones acquired in the first step 1 to which the received speech most closely matches and stopping. Otherwise, proceeding to the next step.

If the language of the received speech is known but no phones were acquired in the second step 2 in the language then the eighth step 8 of the method is comparing the received speech to the phones acquired in the first step 1 and declaring the received speech to include the phones acquired in the first step 1 to which the received speech most closely matches and stopping. Otherwise, proceeding to the next step.

If phones were acquired in the second step 2 in the language of the received speech but no pronunciation dictionary was acquired in the third step 3 for the phones acquired in the second step 2 then the ninth step 9 of the method is comparing the received speech to the phones acquired in the first step 1 that are valid in the language of the received speech and declaring the received speech to include the phones acquired in the first step 1 that are valid in the language of the received speech to which the received speech most closely matches and stopping. Otherwise, proceeding to the next step.

If a pronunciation dictionary was acquired in the third step 3 for the phones acquired in second step 2 in the language of the received speech but no transcript was acquired in the fourth step 4 in the language of the received speech then the tenth, and last, step 10 of the method is comparing the received speech to the phones acquired in the first step 1 that are valid in the language of the received speech and declaring the received speech to include the phones acquired in the first step 1 that are valid in the language of the received speech to which the received speech most likely matches considering the probability of occurrence of each phone in the pronunciation dictionary and stopping.

In an first alternate embodiment, the present method further includes the step of if a transcript was acquired in the fourth step 4 but no speech was acquired in the fifth step 5 for the transcript then comparing the received speech to the phones acquired in the first step 1 that are valid in the language of the received speech and declaring the received speech to include the phones acquired in the first step 1 that are valid in the language of the received speech to which the received speech most likely matches considering the probability of occurrence of each phone in the transcript and stopping.

In a second alternate embodiment, the present method further includes the step of if speech was acquired in the fifth step 5 for the transcript then replacing the phones acquired in the first step 1 with the corresponding phone in the speech acquired in the fifth step 5 and comparing the received speech to the phones acquired in the first step 1 as replaced that are valid in the language of the received speech and declaring the received speech to include the phones acquired in the first step 1 as replaced that are valid in the language of the received speech to which the received speech most likely matches considering the probability of occurrence of each phone in the speech acquired in the fifth step 5 and stopping.

Figure 2:
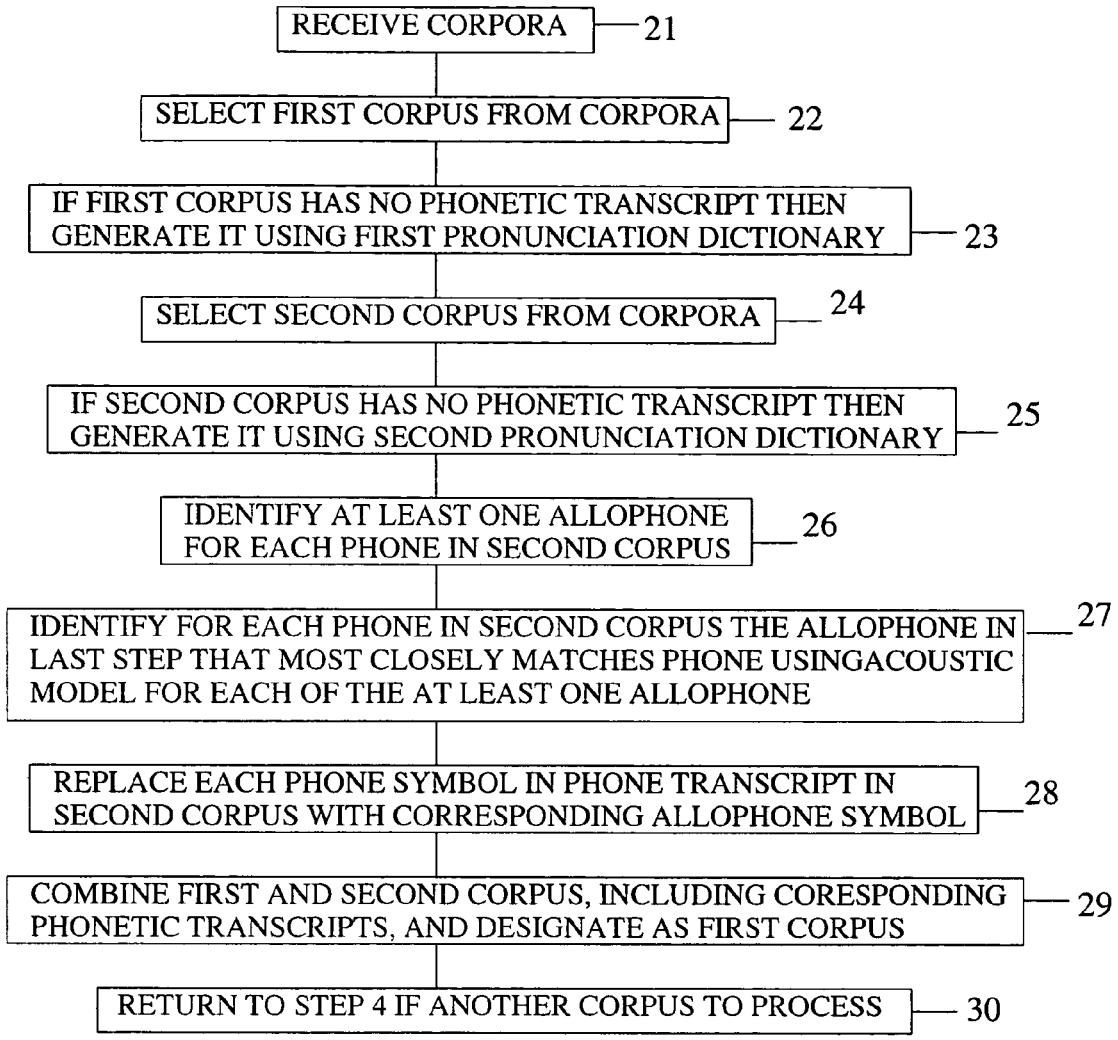
FIG. 2 is a list of the steps for acquiring phones in all languages.

FIG. 2 is a list of steps of the present method for acquiring phones for all languages (the first step 1 described in FIG. 1 and above).

The first step 21 of the method listed in FIG. 2 is receiving corpora. In the preferred embodiment, different languages are represented by the corpora. However, the present invention is not limited to having only one corpus per language. More than one corpus may be in the same language.

The second step 22 of the method is selecting a first corpus from the corpora. In the preferred embodiment, the corpus within the corpora for which the most phonetic information is known is selected as the first corpus. In an alternate embodiment, the first corpus selected from the corpora is the corpus in the native language of the user.

If the first corpus does not include a phonetic transcript then the third step 23 of the method is generating a phonetic transcript of the first corpus using a user-definable first pronunciation dictionary, where each word in the first corpus is associated with at least one sequence of at least one phone symbol. In the preferred embodiment, the phonetic transcript of the first corpus is generated by associating each word in the first corpus to at least one sequence of at least one phone symbol in the pronunciation dictionary which most closely matches the actual phones of the word.

The fourth step 24 of the method is selecting a second corpus from the corpora.

If the second corpus does not include a phonetic transcript then the fifth step 25 of the method is generating a phonetic transcript of the second corpus using a user-definable second pronunciation dictionary, where each word in the second corpus is associated with at least one sequence of at least one phone symbol. In the preferred embodiment, the phonetic transcript of the second corpus is generated by associating each word in the second corpus to at least one sequence of at least one phone symbol in the user-definable second pronunciation dictionary which most closely matches the actual phones of the word.

The sixth step 26 of the method is identifying at least one allophone for each phone in the second corpus.

The seventh step 27 of the method is identifying for each phone in the second corpus one of the at least one allophone identified in the sixth step 26 that most closely matches the phone in the second corpus using a user-definable acoustic model for each of the at least one allophone.

The eighth step 28 of the method is replacing each phone symbol in the phonetic transcript of the second corpus with a symbol for the corresponding allophone identified in the seventh step 27.

The ninth step 29 of the method is combining the first corpus and the second corpus, including the phonetic transcript of the first corpus and the phonetic transcript of the and second corpus, and designating the result as the first corpus.

The tenth, and last, step 30 of the method is returning to the fourth step 24 if there is another corpus in the corpora to be processed. Otherwise stopping.

In an alternate embodiment, a user-definable number of phonetic symbols from the transcript of the second corpus are deleted.

What is claimed is:

1. A method of recognizing phones in speech of any language, comprising the steps of:

(a) acquiring phones for all languages, including information on the phones that indicate in which languages the phones are valid;

(b) acquiring phones for each of a user-definable number of languages;

(c) acquiring a pronunciation dictionary for said user-definable number of languages for which phones where acquired in step (b), and performing a statistical analysis of each pronunciation dictionary acquired to determine the probability of occurrence of each phone in the pronunciation dictionary;

(d) acquiring at least one transcript of speech for each of said user-definable number of languages, where each of the at least one transcript identifies the phones included therein, and performing a statistical analysis of each transcript acquired to determine the probability of occurrence of each phone in the transcript;

(e) acquiring speech for a user-definable number of the at least one transcript acquired in step (d) and performing a statistical analysis of each speech acquired to determine the probability of occurrence of each phone in the speech;

(f) receiving speech for which phones contained therein are not identified;

(g) if the language of the received speech is not known then comparing the received speech to the phones acquired in step (a) and declaring the received speech to include the phones acquired in step (a) to which the received speech most closely matches and stopping, otherwise proceeding to the next step;

(h) if the language of the received speech is known but no phones were acquired in step (b) in the language then comparing the received speech to the phones acquired in step (a) and declaring the received speech to include the phones acquired in step (a) to which the received speech most closely matches and stopping, otherwise proceeding to the next step;

(i) if phones were acquired in step (b) in the language of the received speech but no pronunciation dictionary was acquired in step (c) for the phones acquired in step (b) then comparing the received speech to the phones acquired in step (a) that are valid in the language of the received speech and declaring the received speech to include the phones acquired in step (a) that are valid in the language of the received speech to which the received speech most closely matches and stopping, otherwise proceeding to the next step; and (j) if a pronunciation dictionary was acquired in step (c) for the phones acquired in step (b) in the language of the received speech but no transcript was acquired in step (d)

in the language of the received speech then comparing the received speech to the phones acquired in step (a) that are valid in the language of the received speech and declaring the received speech to include the phones acquired in step (a) that are valid in the language of the received speech to which the received speech most likely matches considering the probability of occurrence of each phone in the pronunciation dictionary and stopping.

2. The method of claim 1, further including the step of if a transcript was acquired in step (d) but no speech was acquired in step (e) for the transcript then comparing the received speech to the phones acquired in step (a) that are valid in the language of the received speech and declaring the received speech to include the phones acquired in step (a) that are valid in the language of the received speech to which the received speech most likely matches considering the probability of occurrence of each phone in the transcript and stopping.

3. The method of claim 2, further including the step of if speech was acquired in step (e) for the transcript then replacing the phones acquired in step (a) that are valid in the language of the received speech with the phones of the acquired speech and comparing the received speech to the phones acquired in step (a) as replaced that are valid in the language of the received speech and declaring the received speech to include the phones acquired in step (a) as replaced that are valid in the language of the received speech to which the received speech most likely matches considering the probability of occurrence of each phone in the speech acquired in step (e) and stopping.

4. The method of claim 1, wherein said step of acquiring phones for all languages is comprised of the step of selecting a phone acquisition method from the list of phone acquisition methods consisting of acquiring an existing database of phones for all languages and creating a database of phones for all languages.

5. The method of claim 1, wherein said step of acquiring phones for each of said user-definable number of languages is comprised of the step of selecting a phone acquisition method from the list of phone acquisition methods consisting of acquiring an existing database of phones for each of said user-definable number of languages and creating a database of phones for each of said user-definable number of languages.

6. The method of claim 1, wherein said step of acquiring said pronunciation dictionary for said user-definable number of languages is comprised of the step of selecting a pronunciation dictionary acquisition method from the list of pronunciation dictionary acquisition methods consisting of acquiring an existing database of said pronunciation dictionary for said user-definable number of languages and creating said pronunciation dictionary for said user-definable number of languages.

7. The method of claim 1, wherein said step of acquiring at least one transcript of speech is comprised of the step of selecting a transcript acquisition method from the list of transcript acquisition methods consisting of acquiring an existing database of transcripts and creating transcripts.

8. The method of claim 1, wherein said step of acquiring speech for said user-definable number of the at least one transcript acquired in step (d) is comprised of the step of selecting a speech acquisition method from the list of speech acquisition methods consisting of acquiring an existing database of speech and creating a database of speech.

9. The method of claim 1, wherein said step of performing said statistical analysis of each pronunciation dictionary is comprised of the step of performing an n-gram analysis of each pronunciation dictionary.

10. The method of claim 1, wherein said step of performing a statistical analysis of each transcript is comprised of the step of performing an n-gram analysis of each transcript.

11. The method of claim 1, wherein said step of performing said statistical analysis of each speech acquired is comprised of the step of performing an n-gram analysis of each speech acquired.

12. The method of claim 1, wherein said method of acquiring phones for all languages is comprised of the steps of:
(a) receiving corpora;
(b) selecting a first corpus from the corpora;
(c) if the first corpus does not include a phonetic transcript of the first corpus then generating the phonetic transcript of the first corpus using a user-definable first pronunciation dictionary, where each word in the first corpus is associated with at least one sequence of at least one phone symbol;
(d) selecting a second corpus from the corpora;
(e) if the second corpus does not include a phonetic transcript of the second corpus then generating a phonetic transcript for the second corpus using a user-definable second pronunciation dictionary, where each word in the second corpus is associated with at least one sequence of at least one phone symbol;
(f) identifying at least one allophone for each phone in the second corpus;
(g) identifying for each phone in the second corpus one of the at least one allophone identified in step (f) that most closely matches the phone in the second corpus using a user-definable acoustic model for each of the at least one allophone;
(h) replacing each phone symbol in the phonetic transcript of the second corpus with a symbol for the corresponding allophone identified in step (g);
(i) combining the first corpus and the second corpus, including the phonetic transcript of the first corpus and the phonetic transcript of the second corpus, and designating the result as the first corpus; and
(j) returning to step (d) if there is another corpus in the corpora to be processed, otherwise stopping.

13. The method of claim 12, wherein the step of receiving corpora is comprised of receiving corpora that are not all in the same language.

14. The method of claim 13, wherein the step of selecting a first corpus from the corpora is comprised of the step of selecting a first corpus from the corpora for which most in known phonetically.

15. The method of claim 14, wherein the step of selecting a first corpus from the corpora is comprised of selecting a first corpus in a native language of a user of the method from the corpora.

16. The method of claim 15, wherein the step of generating the phonetic transcript of the first corpus is comprised of associating each word in the first corpus with at least one sequence of at least one phone symbol in the user-definable first pronunciation dictionary which most closely matches actual phones of the word.

17. The method of claim 16, wherein the step of generating the phonetic transcript of the second corpus is comprised of associating each word in the second corpus with at least one sequence of at least one phone symbol in the user-definable second pronunciation dictionary which most closely matches actual phones of the word.

18. The method of claim 17, further including the step of deleting a user-definable number of phonetic symbols from the transcript of the second corpus.

19. The method of claim 12, wherein the step of selecting a first corpus from the corpora is comprised of the step of selecting a first corpus from the corpora for which most in known phonetically.

20. The method of claim 12, wherein the step of selecting a first corpus from the corpora is comprised of selecting a first corpus in a native language of a user of the method from the corpora.

21. The method of claim 12, wherein the step of generating the phonetic transcript of the first corpus is comprised of associating each word in the first corpus with at least one sequence of at least one phone symbol in the user-definable first pronunciation dictionary which most closely matches actual phones of the word.

22. The method of claim 12, wherein the step of generating the phonetic transcript of the second corpus is comprised of associating each word in the second corpus with at least one sequence of at least one phone symbol in the user-definable second pronunciation dictionary which most closely matches actual phones of the word.

23. The method of claim 12, further including the step of deleting a user-definable number of phonetic symbols from the transcript of the second corpus.

* * * * *